(12) United States Patent
Okumura et al.

(10) Patent No.: US 9,592,825 B2
(45) Date of Patent: Mar. 14, 2017

(54) VEHICLE CONTROL SYSTEM

(71) Applicant: TOYOTA JIDOSHA KABUSHIKI KAISHA, Toyota-shi (JP)

(72) Inventors: Kazuya Okumura, Toyota (JP); Hayato Yoshikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/655,409

(22) PCT Filed: Oct. 11, 2013

(86) PCT No.: PCT/JP2013/077751
§ 371 (c)(1),
(2) Date: Jun. 25, 2015

(87) PCT Pub. No.: WO2014/103474
PCT Pub. Date: Jul. 3, 2014

(65) Prior Publication Data
US 2015/0329109 A1    Nov. 19, 2015

(30) Foreign Application Priority Data
Dec. 26, 2012 (JP) .................................. 2012-282222

(51) Int. Cl.
*B60W 30/045* (2012.01)
*B60T 7/12* (2006.01)
*B60T 8/1755* (2006.01)

(52) U.S. Cl.
CPC ............. *B60W 30/045* (2013.01); *B60T 7/12* (2013.01); *B60T 8/1755* (2013.01);
(Continued)

(58) Field of Classification Search
CPC .... B60W 30/045; B60W 2710/12; B60T 7/12
See application file for complete search history.

(56) References Cited

U.S. PATENT DOCUMENTS

2007/0239340 A1* 10/2007 Miura ................... B60W 10/04
701/70
2010/0106374 A1* 4/2010 Miyajima ............. B60T 8/1755
701/41

(Continued)

FOREIGN PATENT DOCUMENTS

JP     2000 203299     7/2000
JP     2000 203300     7/2000

(Continued)

OTHER PUBLICATIONS

International Search Report Issued Jan. 7, 2014 in PCT/JP2013/077751 Filed Oct. 11, 2013.

Primary Examiner — Yonel Beaulieu
Assistant Examiner — Martin Weeks
(74) Attorney, Agent, or Firm — Oblon, McClelland, Maier & Neustadt, L.L.P.

(57) ABSTRACT

A vehicle control system is provided with a first driving force control means that controls a turning performance of a vehicle by controlling a driving force delivered from a prime mover to driving wheels so as to adjust the turning condition of the vehicle to an intended turning condition. The first driving force control means is configured to calculate a correction amount of the driving force required to adjust an actual turning condition of the vehicle to the intended turning condition, and to restrict the correction amount to zero or smaller so as not to increase the driving force if the correction amount is positive value.

10 Claims, 4 Drawing Sheets

(52) U.S. Cl.
CPC ..... *B60T 2201/16* (2013.01); *B60T 2270/303* (2013.01); *B60W 2710/12* (2013.01)

(56) References Cited

U.S. PATENT DOCUMENTS

| | | | |
|---|---|---|---|
| 2012/0316744 A1* | 12/2012 | Shimura | B60T 8/1755 |
| | | | 701/72 |
| 2013/0103228 A1 | 4/2013 | Suzuki | |
| 2014/0058643 A1* | 2/2014 | Kodama | G06F 17/00 |
| | | | 701/82 |

FOREIGN PATENT DOCUMENTS

| | | |
|---|---|---|
| JP | 2001 295679 | 10/2001 |
| JP | 2005 88875 | 4/2005 |
| JP | 2007 253892 | 10/2007 |
| JP | 2011 201366 | 10/2011 |
| JP | 2012 60722 | 3/2012 |
| WO | WO 2012/005260 A1 | 1/2012 |
| WO | 2012 042935 | 4/2012 |

\* cited by examiner

VEHICLE CONTROL SYSTEM

TECHNICAL FIELD

The present invention relates to a vehicle control system configured to stabilize turning behavior of a vehicle by controlling a driving force and a braking force of the vehicle.

BACKGROUND ART

Control systems for stabilizing a turning condition of a vehicle are known in the art. The conventional control systems are configured to adjust a turning condition exemplified by a yaw rate to a target turning condition determined based on a vehicle speed and a steering angle by controlling a driving force (or a braking force) of the vehicle. Given that a driving force rotating rear wheels is reduced during turning by reducing an engine power or increasing a braking force applied to the rear wheels, a load applied to front wheels being steered is increased and hence a lateral force acting on the front wheels is increased thereby increasing a yaw of the vehicle. To the contrary, given that the driving force rotating the rear wheels is increased, the yaw is reduced. Specifically, the yaw of the rear wheel layout vehicle is increased by rotating an outer rear wheel faster than an inner rear wheel during turning. To the contrary, the yaw of the rear wheel layout vehicle is decreased by reducing a speed difference between the outer rear wheel and the inner rear wheel during turning.

Japanese Patent Laid-Open No. 2005-88875 describes a motion control device for controlling a driving force and a braking force applied to wheels to stabilize a turning behavior of a vehicle even if a brake is operated during turning. According to the teachings of Japanese Patent Laid-Open No. 2005-88875, when a braking operation is detected during turning, a control ratio of the braking force applied to drive wheels and the driving force rotating the driving wheels generated by an engine is equalized, and then, the control ratio of the driving force generated by the engine is increased.

Japanese Patent Laid-Open Nos. 2000-203300 and 2000-203299 describe vehicle controllers for stabilizing a turning performance of a vehicle until reaching the performance limit governed by a friction coefficient etc. According to the teachings of those prior art documents, a driving force of the engine is reduced depending upon an increment of a speed difference between the right and the left wheels, or upon a mechanical limit exceedance of a target power ratio to the right and left wheels.

As described, a control device taught by Japanese Patent Laid-Open No. 2005-88875 is configured to improve turning performance of a vehicle by equalizing the control ratio between the braking force applied to the wheels and the driving force rotating the wheels upon execution of the braking operation during turning, and then increasing the ratio of controlling the driving force. Specifically, if the vehicle does not turn enough, the driving force applied to the wheels is increased and the braking force applied to the inner wheel is reduced. By contrast, if the vehicle turns more sharply than intended, the driving force applied to the wheels is reduced and the braking force applied to the inner wheel is increased. Then, the ratio of controlling the driving force is increased after controlling the driving force and the braking force. Thus, according to a control device taught by Japanese Patent Laid-Open No. 2005-88875, the control ratio between the braking force applied to the wheels and the driving force rotating the wheels is equalized upon execution of the braking operation during turning to improve the turning performance, and then the driving force is increased. If the driving force is increased while applying the braking force to the wheels under the condition that the vehicle does not turn enough, the fuel may be consumed wastefully.

SUMMARY OF INVENTION

The present invention has been conceived noting the foregoing technical problem, and it is therefore an object of the present invention is to provide a vehicle control system configured to improve turning performance (or turning condition) as well as fuel efficiency of a vehicle.

The vehicle control system is provided with a first driving force control means that controls a turning performance of a vehicle by controlling a driving force delivered from a prime mover to driving wheels so as to adjust the turning condition of the vehicle to an intended turning condition. In order to achieve the above-mentioned objective, according to the present invention, the first driving force control means is configured to calculate a correction amount of the driving force required to adjust an actual turning condition of the vehicle to the intended turning condition, and to restrict the correction amount to zero or smaller so as not to increase the driving force if the correction amount is positive value.

The first driving force control means may be further configured to restrict the correction amount to a limit value calculated in a manner to prevent a reduction in the driving force, if the correction amount of the driving force required to adjust the actual turning condition of the vehicle to the intended turning condition is negative value.

The vehicle control system is further comprised of a second driving force control means that is configured to calculate a difference between the driving forces applied to the right and the left wheels required to adjust the actual turning condition of the vehicle to the intended turning condition, based on the correction amount calculated by the first driving force control means. In addition, the vehicle control system is configured to adjust the turning condition of the vehicle to the intended turning condition by the first driving force control means and the second driving force control means.

The second driving force control means may include a braking device adapted to apply a braking force to each wheel.

The second driving force control means may also include a differential gear unit adapted to control a distribution ratio of the driving force to the right and the left wheels.

According to the present invention, the correction amount of the driving force delivered from the prime mover to the driving wheels is calculated to adjust the turning condition to the intended condition. Then, if the correction amount is positive value that increases the driving force, the correction amount is restricted to zero or smaller. Consequently, the correction amount of the driving force is restricted to be smaller than zero so that the fuel will not be consumed to increase the driving force to turn the vehicle. Thus, the turning performance as well as the fuel efficiency of a vehicle can be improved.

By contrast, if the correction amount is negative value that decreases the driving force, the negative correction amount is restricted to the limit value calculated in a manner to prevent a reduction in the driving force. For this reason, an unintended speed reduction and resultant uncomfortableness can be prevented. In addition, the driving force will not be controlled beyond the systematic limitations.

Thus, the actual turning condition of the vehicle is adjusted to the intended turning condition to improve the turning performance by differentiating the driving forces applied to the right and left wheels while controlling the driving force based on the limited correction amount.

DESCRIPTION OF THE PREFERRED EMBODIMENT(S)

Figure 2:
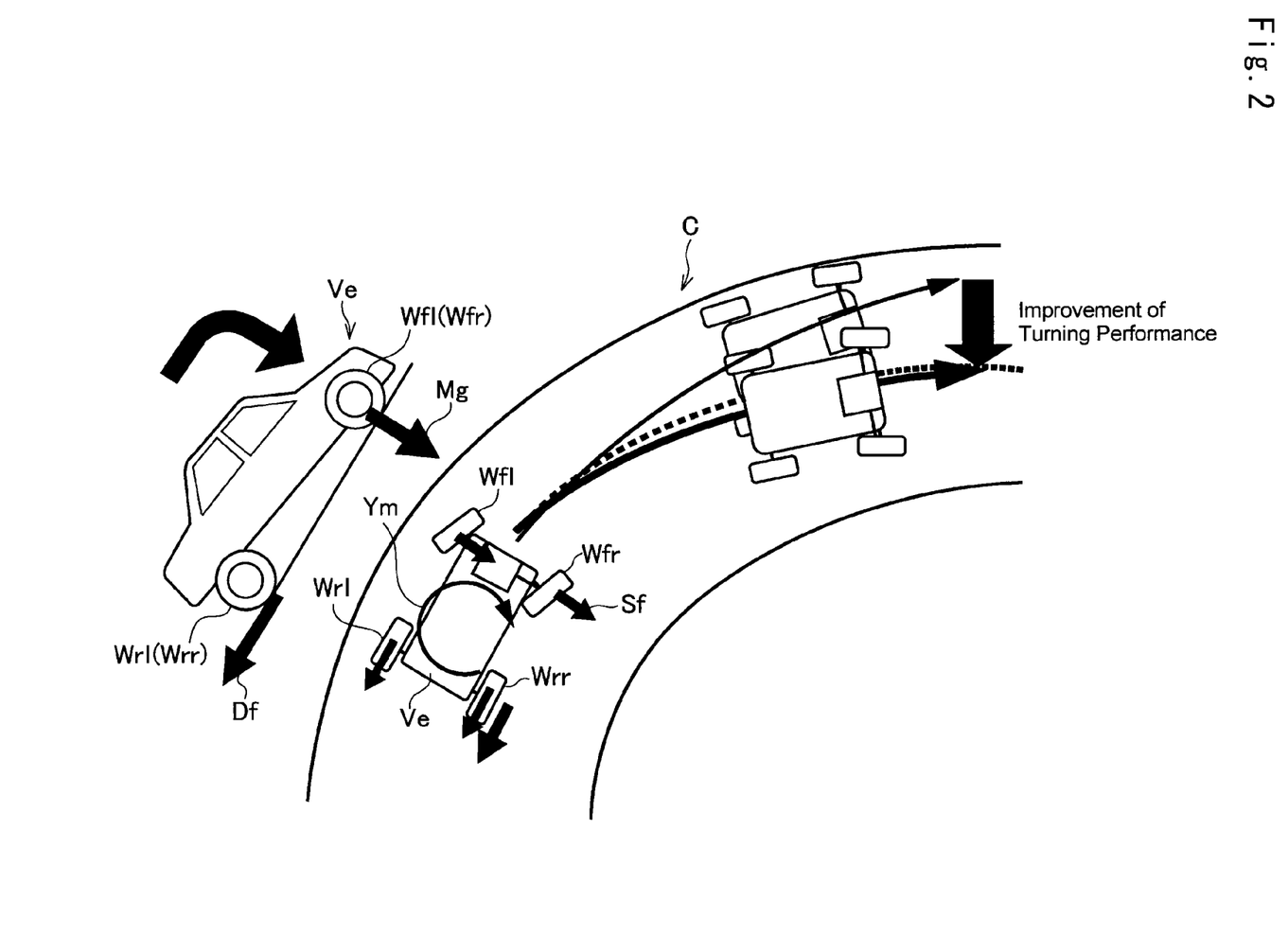
FIG. 2 is a schematic illustration showing a principle of controlling a turning condition.

A preferred example of the present invention will now be described with reference to the accompanying drawings. The vehicle control system of the present invention is configured to control a driving force (or a braking force) applied to wheels in a manner such that an actual turning condition is adjusted to an intended turning condition. Referring now to FIG. 2, there is schematically shown a relation between the driving force applied to drive wheels and the turning condition of a vehicle Ve. The vehicle Ve is comprised of a pair of right and left rear wheels Wrr and Wrl as drive wheels, and a pair of right and left front wheels Wfr and Wfl as steered wheels. In the situation illustrated in FIG. 2, the vehicle Ve is turning a corner C while turning the front wheels Wfr and Wfl. In this situation, a vertical load Mg acting on each front wheel Wfr and Wfl will be varied in response to a change in a driving force Df applied to the rear wheels Wrr or Wrl. Consequently, a lateral force Sf acting on each front wheels Wfr and Wfl being turned is varied by such change in the vertical load Mg, and hence a yaw moment Ym of the vehicle Ve is changed. Specifically, the yaw moment Ym of the vehicle Ve is increased by increasing the vertical load Mg to increase the lateral force Sf. The yaw moment Ym of the vehicle Ve may also be increased by a braking operation to reduce the driving force rotating the inner wheel to be smaller than that rotating the outer wheel. In order to adjust an actual turning condition to an intended turning condition, according to the preferred example, the vehicle control system is configured to control the yaw rate of the vehicle Ve by controlling a difference between the driving forces Df applied to the right wheel and the left wheel.

Figure 3:
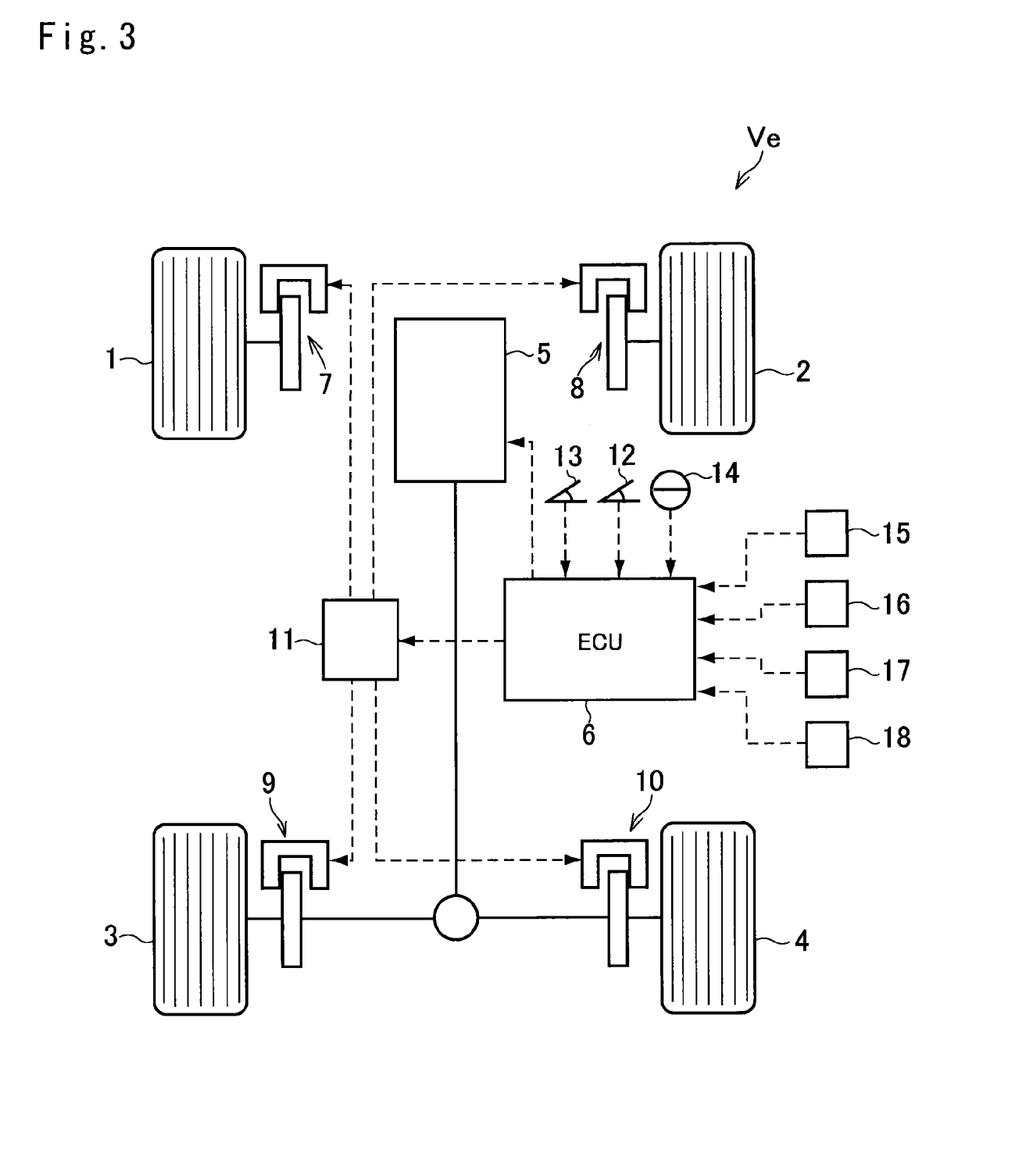
FIG. 3 is a view schematically showing an example of a structure and a control system of the vehicle to which the present invention is applied.

In the vehicle to which the present invention is applied, the difference between the driving forces Df applied to the right wheel and the left wheel can be controlled automatically by changing a driving force or a braking force applied to those wheels independent of operations of an accelerator and a brake device performed by a driver. As shown in FIG. 3, the vehicle Ve comprises a left front wheel 1, a right front wheel 2, a left rear wheel 3, and a right rear wheel 4. Specifically, the vehicle Ve shown in FIG. 3 is a rear-wheel drive layout vehicle in which the rear wheels 3 and 4 are rotated by a prime mover 5.

For example, not only an internal-combustion engine but also an electric motor may be employed as the prime mover 5 of the vehicle Ve. Alternatively, a hybrid drive unit comprised of the internal-combustion engine and the electric motor may also be employed as the prime mover 5. Given that the internal-combustion engine, e.g., a gasoline engine, a diesel engine, or a natural gas engine is used as the prime mover 5, a transmission (not shown) such as a manual transmission or an automatic transmission is disposed on an output side of the prime mover 5. Instead, given that the electric motor is used as the prime mover 5, an electric storage device such as a battery or a capacitor (each of which is not shown) is connected to the electric motor through an inverter or the like.

In order to control driving force of the prime mover 5 rotating the rear wheels 3 and 4, the vehicle Ve is provided with an electronic control unit (ECU) 6. To this end, the ECU 6 is connected to the prime mover 5 so that an output of the prime mover 5 can be controlled to automatically control the driving force of the vehicle Ve generated by the rear wheels 3 and 4 serving as driving wheels.

The wheels 1, 2, 3, and 4 are provided with braking devices 7, 8, 9, and 10 respectively, and those braking devices 7, 8, 9, and 10 are connected to the ECU 6 through a brake actuator 11. That is, the braking force applied to the vehicle Ve can be controlled automatically by controlling operating state of the braking devices 7, 8, 9, and 10 by the ECU 6.

The ECU 6 is configured to receive detection signals from various sensors arranged in the vehicle Ve and information signals from other on-vehicle devices. For example, the ECU 6 receives detection signals from an accelerator sensor 12 that detects a depression angle of a not shown accelerator pedal (or an opening degree of an accelerator), a brake sensor 13 that detects a depression angle of a not shown brake pedal (an opening degree of the brake device), a steering angle sensor 14 that detects a steering angle of a not shown steering wheel, a wheel speed sensor 15 that detects a vehicle speed, a longitudinal acceleration sensor 16 that detects longitudinal acceleration of the vehicle Ve (i.e., in a vertical direction in FIG. 3), a lateral acceleration sensor 17 that detects lateral acceleration of the vehicle Ve (i.e., in a horizontal direction in FIG. 3), a yaw rate sensor 18 that detects a yaw rate of the vehicle Ve, a torque sensor (not shown) that detects output torque of the prime mover 5, and so on.

Figure 4:
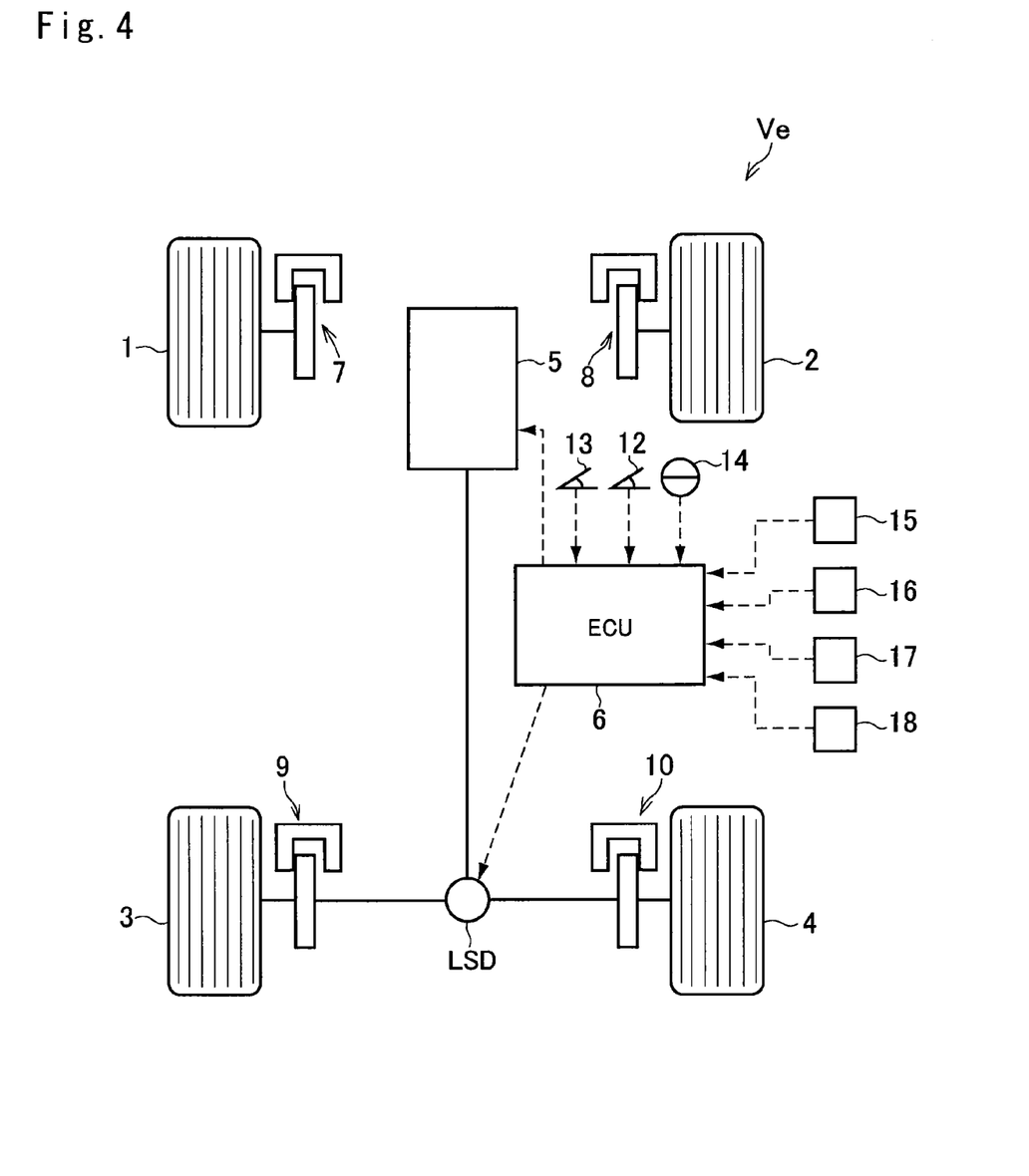
FIG. 4 is a view schematically showing another example of the structure and the control system of the vehicle to which the present invention is applied.

As described, the vehicle control system according to the preferred example is configured to control a difference between driving forces (or braking forces) applied to the right and left wheels independent of operations of the driver. According to the preferred example, the driving forces applied to the left and right wheels may be differentiated not only by operating the braking device but also by changing a distribution ratio of a drive torque to the right and left wheels. In order to change the distribution ratio of the drive torque to the right and left wheels, as shown in FIG. 4, a differential gear unit LSD may be arranged in the vehicle Ve. In the example shown in FIG. 4, the common reference numerals are allotted to the elements in common with those in the example shown in FIG. 3, and detailed explanation for those common elements will be omitted. As known in the art, the differential gear unit LSD comprises a pair of side gears being opposed to each other across a pinion gear, and a friction clutch disposed between one of the side gears and a gear case. The distribution ratio of the drive torque to the right and left wheels connected individually to the side gear can be altered by changing an engagement force of the friction clutch to change the drive torque delivered to one of the side gears through the friction clutch.

Given that the driving force is increased under conditions that the front wheels 1 and 2 are turned at a certain angle, a center of inertia of the vehicle Ve shifted rearward depending on a steering angle representing an operating amount of a steering wheel, a vehicle speed, a friction coefficient of road surface etc., and hence the vertical load acting on the front wheels 1 and 2 is reduced. Consequently, the lateral force acting on the front wheels 1 and 2 being turned is also reduced. To the contrary, given that the driving force is decreased under conditions that the front wheels 1 and 2 are turned at a certain angle, a center of inertia of the vehicle Ve shifted frontward and hence the vertical load acting on the front wheels 1 and 2 is increased. Consequently, the lateral force acting on the front wheels 1 and 2 steering wheels is also increased. Meanwhile, the yaw moment of the vehicle is increased by reducing a driving force applied to the inner wheel to be smaller than that applied to the outer wheel, or otherwise increasing a braking force applied to the inner rear wheel to be larger than that applied to the outer wheel. To the contrary, the yaw moment of the vehicle is decreased by increasing the driving force applied to the inner wheel to be larger than that applied to the outer wheel, or otherwise reducing the braking force applied to the inner rear wheel to be smaller than that applied to the outer wheel. It is to be noted that the turning performance can be changed or improved more effectively by differentiating the driving force or braking force applied to the inner wheel and the outer wheel, rather than adjusting the driving forces applied to both rear wheels.

According to the preferred example, the vehicle control system is configured to improve turning performance and to reduce fuel consumption by performing the control of differentiating driving forces or braking forces applied to the inner and the outer wheels, cooperatively with the control of driving force applied to the driving wheels.

Figure 1:
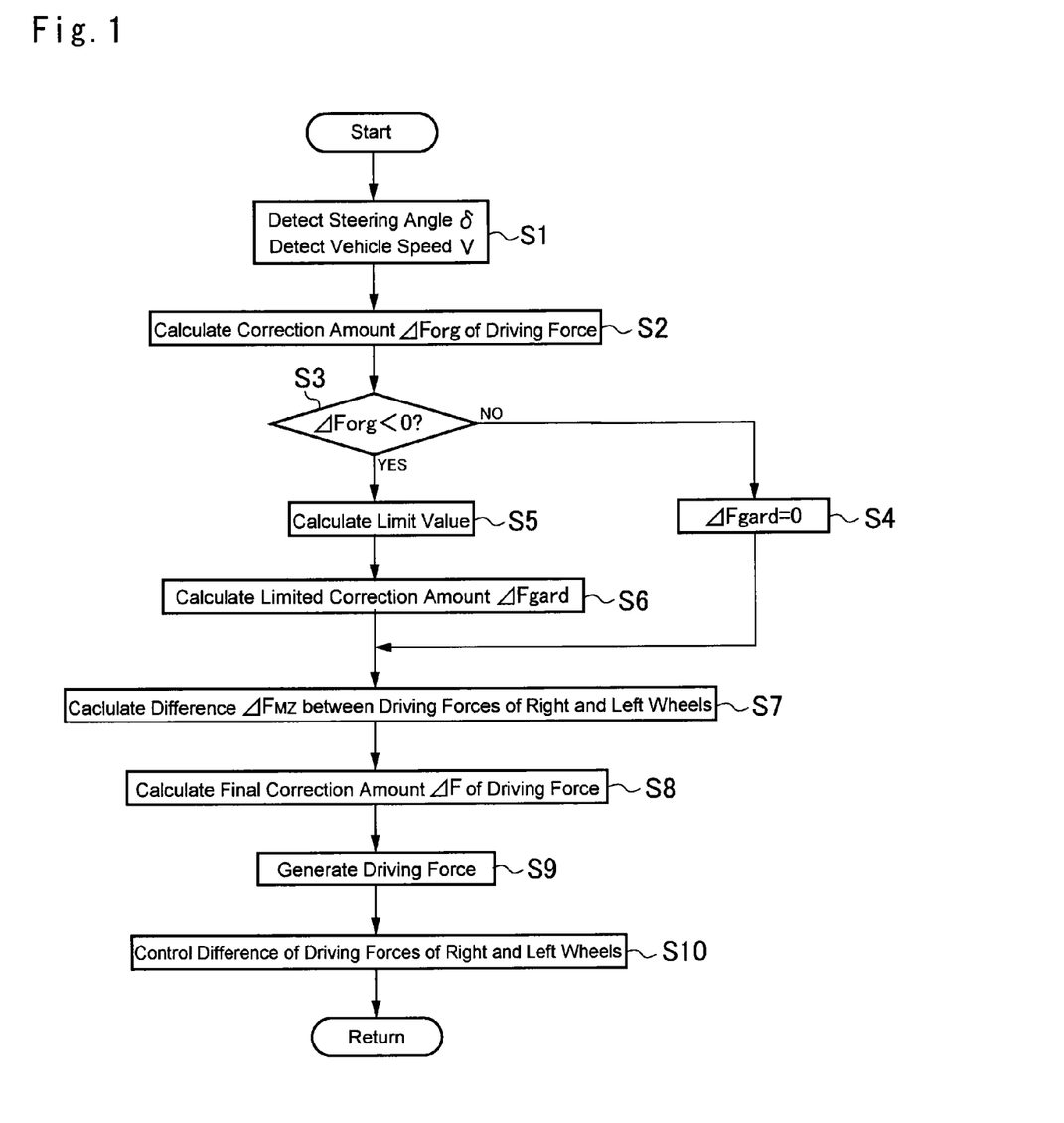
FIG. 1 is flowchart for explaining an example of the control to be carried out by the vehicle control system according to the present invention.

Referring now to FIG. 1, there is shown a control example of the preferred example, and the routine shown therein is repeated at predetermined intervals. First of all, a steering angle δ is detected by the steering angle sensor 14 and a vehicle speed V is detected by the speed sensor 15 (at step S1). Then, a correction amount $\Delta F_{org}$ of a driving force is calculated based on a specification of the vehicle Ve and the vehicle speed V (at step S2). Specifically, an intended turning condition (e.g., a target yaw rate or a target stability factor) can be calculated based on the vehicle speed V and the steering angle δ, and an actual turning condition can be calculated based on the detected value of the yaw rate sensor 18 and the vehicle speed V. That is, the correction amount $\Delta F_{org}$ thus calculated at step S2 is used to adjust the actual turning condition to the intended turning condition only by adjusting the driving force applied to the driving wheels. Basically, the above-mentioned intended turning condition is calculated without taking account of a response delay of the wheels from the operation of the steering wheel. However, the driving force or the braking force applied to the driving wheels is established with some delay from an operation of the accelerator or the brake. For this reason, the correction amount $\Delta F_{org}$ is calculated taking account of a response delay of the steered wheels from the operation of the steering wheel. For example, the correction amount $\Delta F_{org}$ can be calculated using the following Formula 1.

[Formula 1]

$$\Delta F_{org} = \frac{m}{2 \cdot F4(\delta + 2 \cdot \delta_{n-1} + \delta_{n-2})}$$

$$\left\{ -\left[\left(F2 - \frac{2 \cdot F3}{T}\right)\delta + 2 \cdot F2 \cdot \delta_{n-1} + \left(F2 + \frac{2 \cdot F3}{T}\right)\delta_{n-2}\right] \pm \right.$$

$$\sqrt{\left[\begin{array}{c}\left[\left(F2\frac{2 \cdot F3}{T}\right)\delta + 2 \cdot F2 \cdot \delta_{n-1} + \left(F2 + \frac{2 \cdot F3}{T}\right)\delta_{n-2}\right]^2 - \\ 4 \cdot F4(\delta + \delta_{n-1} + \delta_{n-2}) \\ \left[\left(\frac{4 \cdot G \cdot Iz \cdot m \cdot V^2}{T^2} + \frac{2 \cdot F1}{T}\right)\delta \frac{8 \cdot G \cdot Iz \cdot m \cdot V^2}{T^2}\delta_{n-1} + \right. \\ \left.\left(\frac{4 \cdot G \cdot Iz \cdot m \cdot V^2}{T^2} - \frac{2 \cdot F1}{T}\right)\delta_{n-2}\right]\end{array}\right]}$$

$$D = \frac{h \cdot m}{L}$$

$$E1 = \frac{h \cdot m}{L}(Cr \cdot Kf - Cf \cdot Kr)$$

$$E2 = \frac{h \cdot m}{L}(Cf \cdot Lf - Cr \cdot Lr)$$

$$E3 = \frac{h \cdot m}{L}(Cf - Cr)$$

$$E4 = \frac{h \cdot m}{L}(Cf \cdot Lf^2 - Cr \cdot Lr^2)$$

$$G = \frac{Kf \cdot Kr \cdot L}{Kf \cdot Kr \cdot L^2 - m \cdot V^2(Kf \cdot Lf - Kr \cdot Lr)}$$

$$F1 = G \cdot Iz(Kf + Kr)V + G \cdot m(Kf \cdot Lf^2 + Kr \cdot Lr^2)V - m \cdot Kf \cdot Lf \cdot V$$

$$F2 = G \cdot E1 \cdot L^2 + G \cdot F2 \cdot m \cdot V^2 - E1 \cdot L$$

$$F3 = G \cdot Iz \cdot E3 \cdot V + G \cdot E4 \cdot m \cdot V - D \cdot m \cdot Cf \cdot Lf \cdot V$$

$$F4 = D^2 \cdot Cf \cdot Cr \cdot L - G \cdot D^2 \cdot Cf \cdot Cr \cdot L^2$$

In the above Formula 1, "m" is a mass of the vehicle Ve, "h" is a height of the center of the gravity, "L" is a wheelbase, "Iz" is a yaw moment of inertia, "V" is a vehicle speed, "T" is a calculation cycle, "Kf" is a cornering stiffness of the front wheel, "Kr" is a cornering stiffness of the rear wheel, "Cf" is a normalized cornering stiffness of front wheels, "Cr" is a normalized cornering stiffness of rear wheels, "Lf" is a distance between a gravity center and a rotary shaft of the front wheels 1 and 2, "Lr" is a distance between the gravity center and the rotary shaft of the rear wheels 3 and 4, "$\delta_{n-1}$" is a steering angle detected by the steering angle sensor 14 in the previous cycle, and "$\delta_{n-2}$" is a steering angle detected by the steering angle sensor 14 in two cycles before.

Then, it is determined whether or not the correction amount $\Delta F_{org}$ calculated at step S2 is negative value (at step S3). If the calculated correction amount $\Delta F_{org}$ is positive value greater than "0" or equal to "0" so that the answer of step S3 is NO, the actual turning condition is adjusted to the intended turning condition only by adjusting the driving force applied to the driving wheels. In this case, the correction amount $\Delta F_{org}$ is set to "0" (at step S4). Specifically, the correction amount $\Delta F_{org}$ is restricted to a limited correction amount $\Delta F_{gard}$ that is "0" in this case.

By contrast, the correction amount ΔForg calculated at step S2 is negative value smaller than "0" so that the answer of step S3 is YES, the driving force applied to the driving wheels has to be decreased to adjust the actual turning condition to the intended turning condition only by adjusting the driving force. In this case, a limit value of the correction amount ΔForg to prevent an excessive reduction in the driving force is calculated (at step S5). Specifically, such limit value of the correction amount ΔForg is calculated in a manner such that the driver will not feel uncomfortableness resulting from a change in the lateral acceleration. To this end, the limit value of the correction amount ΔForg is calculated taking account of structural limitations such as a limit of changing the driving force within a predetermined period, and a friction coefficient between the drive wheels 3 or 4 and the road surface.

Then, the limited correction amount $\Delta F_{gard}$ of this case is calculated based on the limit value of the correction amount $\Delta F_{org}$ calculated at the step S5, in a manner such that the correction amount $\Delta F_{org}$ calculated at step S2 will not exceed the limit value calculated at step S5 (at step S6). Specifically, if the correction amount $\Delta F_{org}$ calculated at step S2 is greater than the limit value calculated at step S5, the limited correction amount $\Delta F_{gard}$ is set to the limit value of the correction amount $\Delta F_{org}$ calculated at step S5 or to the limit value calculated by subtracting a predetermined value from the limit value calculated at step S5. To the contrary, if the correction amount $\Delta F_{org}$ calculated at step S2 does not exceed the limit value calculated at step S5, the correction amount $\Delta F_{org}$ calculated at step S2 is set to the limited correction amount $\Delta F_{gard}$.

Then, a difference $\Delta F_{MZ}$ between driving forces or braking forces applied to the right and left wheels is calculated based on the limited correction amount $\Delta F_{gard}$ calculated at the steps S4 and S6 (at step S7). In the following description, an example of controlling the turning condition by differentiating the braking forces applied to the right and left wheels will be explained. For example, the difference $\Delta F_{MZ}$ between the braking forces applied to the right and left wheels can be calculated using Formula 2.

[Formula 2]

$$\Delta F_{MZ} = \cfrac{2}{\left(\cfrac{2 \cdot m \cdot V}{T} + Kf + Kr - E3 \cdot \Delta a^*\right) d} \left\{\begin{array}{l} \left(\cfrac{4 \cdot G \cdot Iz \cdot m \cdot V^2}{T^2} + \cfrac{2 \cdot F1}{T}\right)\delta - \cfrac{8 \cdot G \cdot Iz \cdot m \cdot V^2}{T^2}\delta_{n-1} + \\ \left(\cfrac{4 \cdot G \cdot Iz \cdot m \cdot V^2}{T^2} - \cfrac{2 \cdot F1}{T}\right)\delta_{n-2} + \\ \left[\left(F2 - \cfrac{2 \cdot F3}{T}\right)\delta + 2 \cdot F2 \cdot \delta_{n-1} + \left(F2 + \cfrac{2 \cdot F3}{T}\right)\delta_{n-2}\right]\Delta a^* + \\ F4 \cdot (\delta + 2 \cdot \delta_{n-1} + \delta_{n-2})\Delta a^{*2} - 2(Kf + Kr - E3 \cdot \Delta a^*)Mz_{n-1} - \\ \left(Kf + Kr - E3 \cdot \Delta a^* - \cfrac{2 \cdot m \cdot V}{T}\right)Mz_{n-2} \end{array}\right\}$$

$$\Delta a^* = \cfrac{\Delta F_{gard}}{m}$$

In the Formula 2, "$M_{zn-1}$" is a difference between moments produced by the braking forces applied to the right and left wheels calculated in the previous cycle, and "$M_{zn-2}$" is a difference between moments produced by the braking forces applied to the right and left wheels calculated in two cycles before. Here, an absolute value of $\Delta F_{MZ}$ is increased with an increment of the difference between braking forces applied to the right and left wheels.

Then, a final correction amount ΔF of the driving force is calculated based on the difference $\Delta_{MZ}$ between the braking forces applied to the right and left wheels calculated at step S7 (at step S8). Specifically, if the correction amount $\Delta F_{org}$ calculated at the step S2 is larger than or equal to "0", the final correction amount ΔF of the driving force control is set to "0". By contrast, if the correction amount $\Delta F_{org}$ calculated at the step S2 is smaller than "0", the final correction amount ΔF is set to a sum of the limited correction amount $\Delta F_{gard}$ calculated at steps S6 and an absolute value of the difference $\Delta F_{MZ}$ between the braking forces applied to the right and left wheels: ($\Delta F = \Delta F_{gard} + |\Delta F_{MZ}|$).

Next, a driving force required by the driver is calculated based on the opening degree of accelerator and the vehicle speed V, and the prime mover generates a sum of the required driving force and the final correction amount ΔF calculated at step S8 (at step S9). Then, the braking forces of the braking devices 7, 8, 9 and 10, or the driving force distributed through the differential gear LSD is/are controlled in a manner to achieve the difference $\Delta F_{MZ}$ between the driving forces or the braking forces applied to the right and left wheels calculated at the step S7 (at step S10). Specifically, in the vehicle shown in FIG. 3, the braking devices 7, 8, 9 and 10 for the wheels 1, 2, 3 and 4 are individually controlled in a manner to generate the braking forces to achieve the difference $\Delta F_{MZ}$. In turn, in the vehicle shown in FIG. 4, a distribution ratio of the driving force to the right and left wheels through the differential gear LSD is controlled in a manner to achieve the difference $\Delta F_{MZ}$. Here, in an in-wheel motor vehicle in which each wheel is driven by a motor arranged therein, a driving force or a braking force of each motor is individually controlled to differentiate the driving forces of the wheels.

Thus, according to the preferred example, the vehicle control system is not configured to control the turning performance of the vehicle by merely controlling the driving force applied to the drive wheels independently from or simultaneously with differentiating the driving forces delivered to the right and left wheels. That is, the vehicle control system of the present invention is configured to control the driving force applied to the drive wheel first, and then compensate a deficiency in the correction amount of the driving force by differentiating the driving force delivered to the right and left wheels. In addition, according to the preferred example, the driving force delivered to the right and left wheels can be differentiated by controlling the braking forces applied thereto without increasing the output of the prime mover so that fuel will not be consumed to differentiate the driving force delivered to the right and left wheels.

Here will be briefly explained a relation between the foregoing preferred example and the claimed invention. The functional means of steps S3 to S6 serve as the "first driving force control means" of the claimed invention, and functional means of steps S7 and S8 serve as the "second driving force control means" of the claimed invention.

According to the foregoing preferred examples, the vehicle control system of the present invention is applied to a rear-drive layout vehicle in which power of the prime mover 5 is delivered to the rear wheels 3 and 4 to generate drive force of the vehicle. However, the vehicle control system of the present invention may also be applied to a front-wheel layout vehicle in which power of the prime mover 5 is delivered to the front wheels 1 and 2, and to a four-wheel drive vehicle in which power of the prime mover 5 is distributed to all the front and rear wheels 1, 2, 3 and 4. It is to be noted that the turning performance of the vehicle may be improved not only by differentiating the driving forces or braking forces applied to the right and the left wheels of one of the front wheels and the rear wheels, but also differentiating the driving forces or braking forces applied to the right and the left front wheels of both front wheels and the rear wheels. In addition, another kind of gear mechanism adapted to change the torque distribution ratio to the right and left wheels may also be used instead of the differential gear LSD.

The invention claimed is:

1. A vehicle control system, comprising:
a control unit that controls a turning performance of a vehicle by controlling a driving force delivered from a prime mover to driving wheels so as to adjust the turning condition of the vehicle to an intended turning condition and by differentiating driving forces applied to right and left wheels,
wherein the control unit is configured to calculate a correction amount of the driving force required to adjust an actual turning condition of the vehicle to the intended turning condition, and to restrict the correction amount to zero or smaller so as not to increase the driving force if the correction amount is positive value.

2. The vehicle control system according to claim 1, wherein the control unit is further configured to restrict the correction amount to a limit value calculated in a manner to prevent a reduction in the driving force, if the correction amount of the driving force required to adjust the actual turning condition of the vehicle to the intended turning condition is negative value.

3. The vehicle control system as claimed in claim 1, wherein the control unit is further configured to calculate a difference between the driving forces applied to the right and the left wheels required to adjust the actual turning condition of the vehicle to the intended turning condition based on the calculated correction amount.

4. The vehicle control system as claimed in claim 3, wherein the control unit is further configured to differentiate the driving forces applied to right and left wheels by controlling a braking device adapted to apply a braking force to each wheel.

5. The vehicle control system as claimed in claim 3, wherein the control unit is further configured to differentiate the driving forces applied to right and left wheels by controlling a differential gear unit adapted to control a distribution ratio of the driving force to the right and the left wheels.

6. The vehicle control system as claimed in claim 2, wherein the control unit is further configured to calculate a difference between the driving forces applied to the right and the left wheels required to adjust the actual turning condition of the vehicle to the intended turning condition based on the calculated correction amount.

7. The vehicle control system as claimed in claim 6, wherein the control unit is further configured to differentiate the driving forces applied to right and left wheels by controlling a braking device adapted to apply a braking force to each wheel.

8. The vehicle control system as claimed in claim 4, wherein the control unit is further configured to differentiate the driving forces applied to right and left wheels by controlling a differential gear unit adapted to control a distribution ratio of the driving force to the right and the left wheels.

9. The vehicle control system as claimed in claim 6, wherein the control unit is further configured to differentiate the driving forces applied to right and left wheels by controlling a differential gear unit adapted to control a distribution ratio of the driving force to the right and the left wheels.

10. The vehicle control system as claimed in claim 7, wherein the control unit is further configured to differentiate the driving forces applied to right and left wheels by controlling a differential gear unit adapted to control a distribution ratio of the driving force to the right and the left wheels.

* * * * *